United States Patent
Bennett

(10) Patent No.: US 8,086,622 B2
(45) Date of Patent: *Dec. 27, 2011

(54) SEARCH ENGINE USING WORLD MAP WITH WHOIS DATABASE SEARCH RESTRICTIONS

(75) Inventor: James D. Bennett, Hroznetin (CZ)

(73) Assignee: Enpulz, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/433,540

(22) Filed: Apr. 30, 2009

(65) Prior Publication Data

US 2009/0210416 A1 Aug. 20, 2009

Related U.S. Application Data

(63) Continuation-in-part of application No. 11/847,094, filed on Aug. 29, 2007.

(60) Provisional application No. 61/053,670, filed on May 16, 2008.

(51) Int. Cl.
*G06F 17/30* (2006.01)
(52) U.S. Cl. . 707/766; 707/765; 707/769; 707/E17.014; 707/E17.018; 707/E17.032
(58) Field of Classification Search .................. 707/766, 707/765, 999.005
See application file for complete search history.

(56) References Cited

U.S. PATENT DOCUMENTS

| 7,624,101 B2* | 11/2009 | Lin et al. ............................... 1/1 |
| 2002/0027567 A1* | 3/2002 | Niamir .......................... 345/738 |
| 2002/0091923 A1* | 7/2002 | Chipman et al. .............. 713/168 |
| 2004/0064334 A1* | 4/2004 | Nye .................................. 705/1 |
| 2006/0068755 A1* | 3/2006 | Shraim et al. ................. 455/410 |
| 2007/0214284 A1* | 9/2007 | King et al. .................... 709/245 |

\* cited by examiner

*Primary Examiner* — Shyue Jiunn Hwa
(74) *Attorney, Agent, or Firm* — Garlick Harrison & Markison; Bruce E. Garlick

(57) ABSTRACT

A search operation can implement a two step approach to provide geographically restricted and verified information to a user. First, high relevance search results are obtained by searching only in a specifically defined region. Second, the quality of the search results can be improved by performing contact address correlation. If the search server finds a reliable reference address in the search results these search results can be presented to the user after removing-search results not correlating well with legitimate and registered addresses. Therefore, the region-restricted presents only presents legitimate web pages or search results to a user. Thus, the region-restricted search operation improves quality and may minimize search time and reduce a huge volume of non-valued Internet traffic, which is likely to impair the overall performance and experience on the Internet.

19 Claims, 10 Drawing Sheets

SEARCH ENGINE USING WORLD MAP WITH WHOIS DATABASE SEARCH RESTRICTIONS

CROSS REFERENCES TO RELATED APPLICATIONS

The present application is a continuation-in-part of U.S. Utility application Ser. No. 11/847,094, filed Aug. 29, 2007. The present application also claims priority under 35 U.S.C. 119(e) to U.S. Provisional Application Ser. No. 61/053,670, filed May 16, 2008, and having a common title with the present application, both of which are incorporated herein by reference in their entirety for all purposes.

BACKGROUND

1. Technical Field

The present invention relates generally to Internet searches and more specifically to geographical information based search restrictions.

2. Related Art

Searching for information on the Internet is a very common activity that requires the use of a browser capable of retrieving information from a website. Typically, a search website is accessed and search terms are provided by typing in some free form text. A search engine receives the search terms and retrieves search results.

During conventional search operations that are performed using current search engines, geographical information is not used as part of the search. Therefore, search results are returned that may provide information on products or services available half way around the world and that information is often not very useful to a user. Conventional search engines are not based on the concept of prioritizing or limiting search results based on the "distance from a user." Often, people that desiring to locate a store or a service on the Internet may want to find one that is geographically close to where they live or where they are currently searching from. People use maps to find locations and roads to travel. However, during online searches, they are likely to retrieve information devoid of any sense of "proximity" to a user.

When searching based on the world map, contextually irrelevant search results are often displayed. Search engines based on the world map directly show the search results on the map. When a search is done based on a search string, a huge list of search results will be generated and displayed on the client device's screen and possibly marked on the world map. Oftentimes, the map window of the search engine will get cluttered with markers corresponding to search items, mostly less relevant to the current search context.

Current search engines generate a huge amount of redundant traffic during the search operation. Most of the search results that are communicated to a client device are irrelevant and redundant. They appear in the search list just because the search string appears in or correlates to those WebPages. In several contexts, the user is interested in doing the search based on the search string correlating with a title of a webpage, and not on the basis of search string appearing inside the web page content. In that situation if the search engine outputs all the WebPages containing the search string, then most of the search results will be unusable or irrelevant to the user. The required or the most relevant WebPages may appear deep inside the search result list and the user may fail to identify and open this relevant content for his or her use.

In the few map based search engines that are currently available, there is no means to control the items that show up in a search list in terms of the proximity to the user's current location. There are no means to facilitate control on the arbitrary size of the search geographic region, by which a user can systematically partition a large search area on the map to smaller areas, and do the search operations more systematically and locally on the world map. In the current search engines the search region is selectable only to certain extent for e.g. a predefined area or a location such a city, a state, or a country. Often search results comprise of service providers or stores that do not really exist in the region where they are purported to conduct business. Often, when searching for stores in a city, business and web pages show up during a search that are thousands of miles away from the city of interest.

Many online maps provide zooming functionality. User's areas of interest may be zoomed in or out to a certain extent and the details of various locations (for example a restaurant) can be selected and visualized. If the area or the location that is focused on is too large and/or if the user is not aware of the topography of the area, it will be very difficult or confusing to the user when zooming in and out on a particular street and picking the business firm's premise/location that the user is looking for. In other words, it becomes difficult for the user to pick an exact and small location from a predefined large area or location in the map. In this process, the location a user is searching for cannot be resolved properly to select the required optimal search results, and this issue is enhanced when there is a lot of clutter within a small search region of the world map.

In a search operation using current search engines, the user has no control, or at best a limited control, over the search result output for a given search string. The search results presented to the user is in the order of the relevance of the webpage to a user entered search string or on the basis of the popularity of the website, and not on geographic proximity or information. This criterion built into the current search engines are not always the best ones. For example if a user is looking for a restaurant in a nearby place, the search results should be provided in a distance wise order of the physical address of the restaurant from the current location of the user. Often the restaurants located are not related to the user's location, or are located elsewhere but still show up in the search results.

Also, there is a large number of Internet squatters and scammer who try to push their business illegally on the Internet. Their web links gets crawled like any other legal and authentic websites and listed during the search, making the user get confused or misled in picking a right search item from the search result list. Current search engine have no effective algorithms or techniques built-in that can either warn or block/step sites that are related to the Internet squatters and scammers. Due to the lack of this function, the Internet has become a haven for both the legal and illegal businesses. In the process, legal and authentic organizations and businesses are loosing legitimate business to scam artists. Thus, the current search engines are failing in testing and blocking unauthorized or illegal businesses and there are no tests for the authenticity of a website on the Internet when conducting searches. Thus current search engines have no way to identify Internet squatters and scammers among legitimate business on the Internet.

The current web-based search engines do not have any built-in techniques that can determine the current GPS (Global Positioning System) location of the user and mark it on the world map, or use it for searches that are performed by the user. In that case, the user often has no indication or ability to pinpoint searches on his current location in an unknown remote city. Therefore it is hard to find, for example a close coffee shop, even though the user is able to find some random coffee shops that show up on his laptop during a search. This is due to a lack of an ability to incorporate GPS coordinates (longitude and latitude in angle) in searches, which is a serious drawback for user requiring geographic-based search results.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
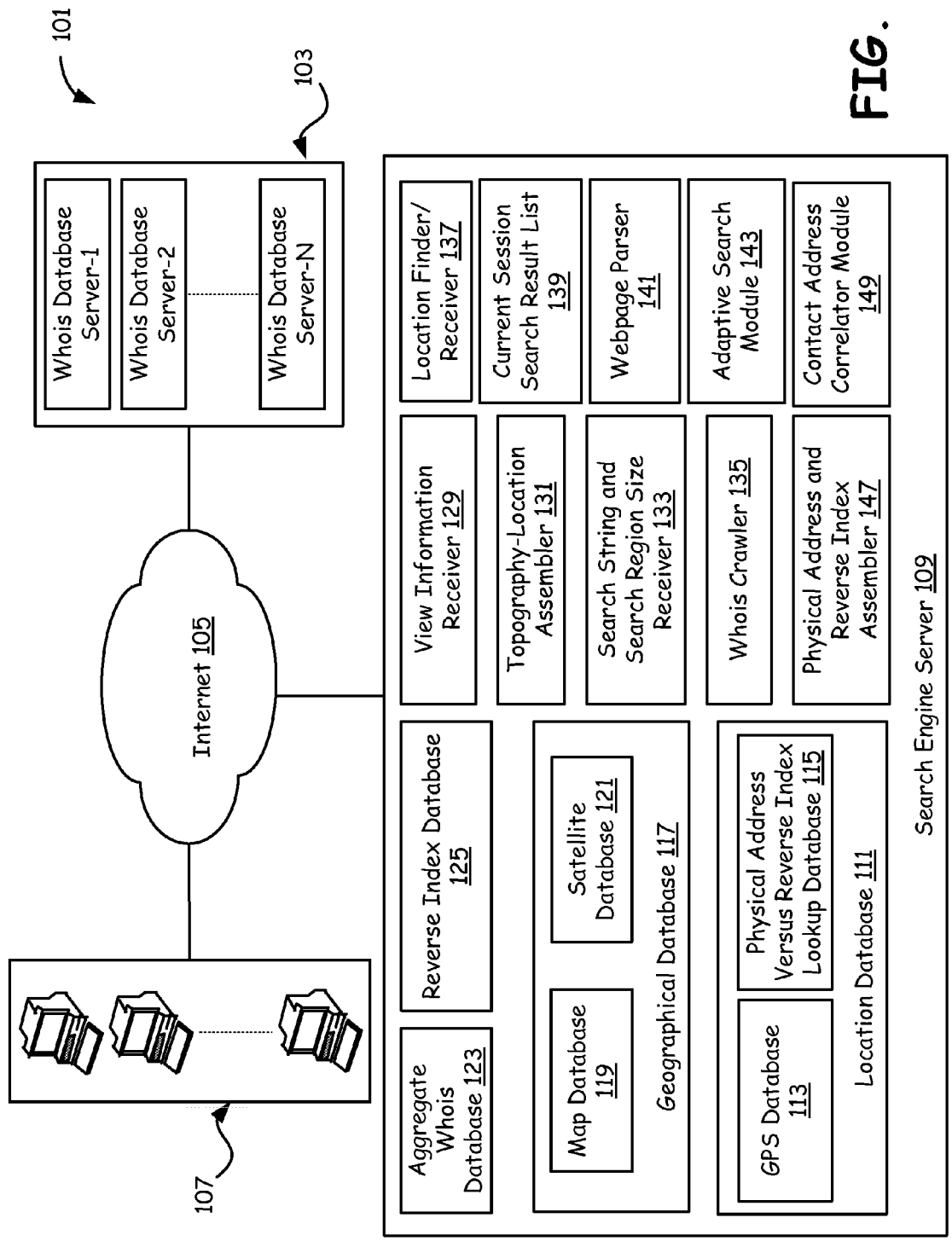
FIG. 1 is a perspective block diagram of a network that facilitates searching on the Internet with a map based searching technique accompanied by search region restrictions and whois data-based verification of the legitimacy of search results.

FIG. 1 is a perspective block/step diagram of a network that supports map-based searching of documents or Internet content. The network 101 of FIG. 1 incorporates a search engine server 109 capable of enforcing map-based search restrictions and a whois database server 103 that provides details of the location and ownership of various websites on the Internet. FIG. 1 deals with a mechanism where, by preprocessing user input information, a dramatic reduction in the unwanted and unsolicited webpage traffic is achieved during a search operation. The reduction in the volume of the search results arising from spurious, illegal, unwanted, and/or fake sites encountered during a search operation is effectively implemented as a two step approach. First, a default search region (size) restriction is applied to the search, and second, a filtering of the spurious and unwanted sites is performed by a method of address correlation. The term spurious and unwanted sites refer to Internet squatters, scammers, and/or other illegal and dangerous sites, as well as those sites that add very little value for searches on the Internet (like ad sites, spam sites, etc) in the context of user's search.

One approach normally followed to contextualize the search operation in the current search engines is by categorizing the search items at several levels making the search contextual, as far as is possible. Business related searches are further contextualized or associated by geographical search restrictions. The search restrictions implemented in some embodiments of the search engines are based on the geographic location within or in proximity to associated default region restrictions (such as 10 miles around a city center). However, city sizes and areas covered by a city are not well defined, and cities, are not uniform in size. This makes the specification of search region restrictions complicated. For example, if a search is made in two different cities with fairly large difference in their city size, the number of hits will likely vary considerably between the two. The embodiments discussed herein facilitates user-defined search regions of arbitrary size and shapes for additional flexibility in restricting search results to those areas associated with geographical regions of interest.

As a first step, to reduce the search results from regions of limited interest to a user to fewer search results of greater interest to a user, search results from a search operation are eliminated based on a user-specified region restriction criteria (or a default region restriction if one is needed). Thus, the search region is restricted based on the user's geographic preferences or choices. The main feature of a user-defined search region is its greater flexibility, so that the users can define their own search region with convenient shape and size, with a convenient search center (i.e. the center of the search region with GPS (Global Positioning System) coordinates) and specific geographic parameters that are meaningful to the user. In one embodiment, a map can be graphically interfaced with a user whereby the user can physically mark the shape, size, and areas to limit his search area and where the computer can map this traced graphical area to meaningful search limitations that help the user narrow his search to only certain areas of interest. Furthermore, a User can interactively alter the search region and relocate its center and do the search iteratively until he finds the search objects or search restrictions of his choice, within some convenient distance from his current location. The flexibility of changing the search region size and location makes the geographic-based search much more flexible for users that are mobile in today's society.

In addition to geographic restriction of search results based on user input, a second step is employed to prevent certain useless, illegal, unwanted, and misleading websites from contaminating the search results. In addition to the search efficiency achieved by search region restriction, this second step will implement post processing of the search result based on address correlation to remove undesirable or unwanted web sites from search result lists. Firstly, when a search is performed for a given search string, web links corresponding to that search string and for the specified search region are gathered together in a list. Secondly, the legitimacy of the web links that are selected is tested. The legitimacy testing is done with respect to the contact address of the business firm retrieved from their web links from the (reverse index) database and web pages. In order to do this, a reference address (database) is derived from an aggregate whois database that is available to the searching system. This reference address is considered as the "legitimate contact address" herein. The other record of the address for the same business firm is from the searched webpage itself, and is called as the "webpage based contact address" herein. This information can be used to validate the authenticity of a web site or page.

When a web link points to a web page and that link is to be eventually placed into a search results list, the web page legitimacy is first tested before it gets presented to a user as part of the search results lists. One of the addresses in this address correlation process is a contact address of a business or firm retrieved from a webpage included in a preliminary search result from a search conducted for a webpage. In one embodiment, a "webpage parser" component of the search engine server parses the webpage and recognizes and extracts the contact address from it, and saves it (as "webpage based contact address") for a subsequent comparison. A "legitimate contact address parser" of the "physical address and reverse index assembler module" (of the search engine server) extracts the required "legitimate contact address" for the purpose of the legitimacy proof of the searched item. Usually, the "legitimate contact address" is some registered business address on a formal registration site on-line, such as a formal whois site or state or federal governmental registration site.

A "search crawler" is employed that develops the "reverse index database" having all the searchable string (items) properly indexed and providing a reference to the associated document or web page by means of a URL or other reference means. A "whois crawler" is employed by a search engine server. This crawler will crawls a plurality of "whois databases" and develops an "aggregate whois database." The legitimate contact address parser of the "physical address and reverse index assembler" module parses all the registered entity's address and associates them with the corresponding searchable items of the "reverse index database." In the process of conducting this operation, a new database called a "physical address versus reverse index lookup database" is generated. In some implementations, it is part of an aggregate whois database or repository.

The "physical address versus reverse index lookup database", not only indexes a searchable string (or item) to a specific host machine for its webpage, it also points an unique physical address (same as its legitimate contact address, enrolled or registered in the whois database) or GPS coordinate of the corresponding business firm, to which that search result item corresponds to, on the world map.

As various illegal sites are not likely to possess a "legitimate contact address" enrolled in the whois database, but with their names existing in the "physical address versus reverse index lookup database" (because they too are crawled), they will neither show up on the search results nor on a search result map (such as a geographical world map), nor in the final search result list (presented in the side pane of the search engine window). This failure to list illegal sites is because of zero or negligible address correlation determined by a "contact address correlator module" of the search engine, such as when the system is comparing web page based content addresses to legitimate contact addresses.

Also, a single searchable string (comprising a product name or the particulars of an item being searched, etc.) is often associated with multiple web links pointing to different web servers and each of the web links often have a legitimate contact address being enrolled in the whois database. But, as the search region is restricted, only those addresses associated with that search string that exist in that specified geographic location (or the search region) will show up in the search list (restrictions on results that show up in a search result set), as well as on the world map (search region or search window), with other addresses that are naturally filtered. This filtering happens because of negligible or zero spatial (or regional) correlation determined by a "reverse index belongs to search region computing module" of the "adaptive search module" of the search engine.

The term "legitimacy" of business firm refers to a status verified via an official registration on one or more domain-name servers (that are crawled during a search operation) and on a "whois server" or a "whois repository." This proper registration allows the system to perform a verification service by maintaining a database of all the domain-name registered websites that are legitimate. In some prior search engines, many illegal links shows up during a search operation. Sometimes this happens due to the redirecting of web links. For example, illegal web links or a proxy web link with no value added services can appear on a registered webpage. When the registered webpage gets crawled, automatically the illegal web links and the proxy web links also show up in the search result list. If a user's mouse clicks on those web links, they open their web pages like any legal web pages. If these illegal web links (that appear in the registered webpage) are directly entered in the address bar of a network browser, the webpage presented will not be the same as the pages obtained during a mouse clicked and opened from a search result, often leading to an unknown or irrelevant web site, indicating that they are illegal or useless.

An "aggregate whois database" that collects whois data from one or more whois servers or databases acts as a reference database for the legitimacy checks of a business or firm that shows up during a search operation from having its website hosted on a server. For example, such an aggregate whois database has to be derived as an aggregate collection of all the registration info/files (details or information) from different whois databases existing in different part of the world. During the aggregation of information from one or more whois databases, it is possible to cross check the information retrieved from more than one source, thereby making it possible to be more accurate in terms of contact details of all the registered business and firms.

A large number of whois databases are maintained by different service providers on the Internet. A search engine module called a "whois crawler" aggregates the contents of all the individual whois databases in a suitable format, giving rise to the "aggregate whois database" that acts like a repository accessible during a search operation to perform search result legitimacy testing. This database can be updated periodically by running the whois crawler, to reflect the changes that occur from time to time. Clearly, a more recent and updated aggregate whois database that is current and all encompassing is beneficial for users, and will result in more accurate legitimacy screening over time.

Each of the whois databases maintained by respective service providers that contributes to the information to the aggregate whois database are in turn an aggregate collection of domain name registration details from various "domain-name servers" (for example). The individual whois database manages the registration process of a particular domain of a plurality of domain-name servers. For example, registrations for domains ending with .net, .com, .org, etc. may be managed by a domain-name server and be associated with a corresponding whois database. Again, a crawler or a similar module on a whois server can assemble the registration details on all the domain-name servers and maintains it as a "whois database," which is subsequently crawled by the whois crawler to do legitimacy screening in accordance with the teachings herein.

The network 101 of FIG. 1 facilitates searching on the Internet with a map-based searching technique accompanied by search region restrictions and a whois data-based verification of legitimacy of search results. In particular, a world-map-based search engine server 109 with access to whois data, such as from a whois database, is able to enforce search region restriction to focus on a specific regional or geographical area. The network 101 comprises the search engine server 109, a plurality of whois database servers 103, and a plurality of client devices 107 that are communicatively coupled together via the Internet 105 or some other wireless, wireline, optical, or other network.

The search engine server 109 has multiple databases such as a geographical database 117 and a location database 111. The geographical database 117 further comprises at least two databases related to world map database 119 and a satellite database 121. The world map database 119 contains the world map data in some image form or related form that can be viewed with different magnifications on the client device display or another graphical user interface, if required. The satellite database 121 contains the topography view of the satellite's earth surface picture.

The location database 111 of search engine server 109 has various information that can be overlaid with the world map to precisely locate certain positions on the world map. The GPS database 113 has GPS coordinate information for a large number of discrete points referenced on the world map at a resolution sufficient to resolve smaller structures (for e.g. smaller buildings) on the earth's surface. The discrete points considered for database 113 are often arranged or set on a rectangular grid of latitude and longitude, as seen on or used for the world map. If the grid size is small, it is easy to determine the location of a place precisely in terms of the GPS coordinates, and if the grid size is larger, there is less resolution with which to pinpoint certain points on the world map.

The "physical address versus reverse index lookup database" 115 of the location database 111, is the combination of the "reverse index database" 125 with the "legitimate contact address" extracted from the aggregate whois database 123. In the process of combining and/or merging these databases to form the aggregate database 115, every searchable string in the reverse index database 125 is associated with multiple web links (as needed) and each web link is associated with a "legitimate contact address" that is identified from one or more sources. Thus, each web link has a unique geographical or physical address on the globe, which is managed and tracked to keep them up-to-date. The extraction of the legitimate contact address from the aggregate whois database 123 is done by a module called a "legitimate contact address parser," which is described in detail in FIG. 4. The "legitimate contact address parser" is a sub-module of "physical address and reverse index assembler 147 shown in FIG. 1.

Figure 4:
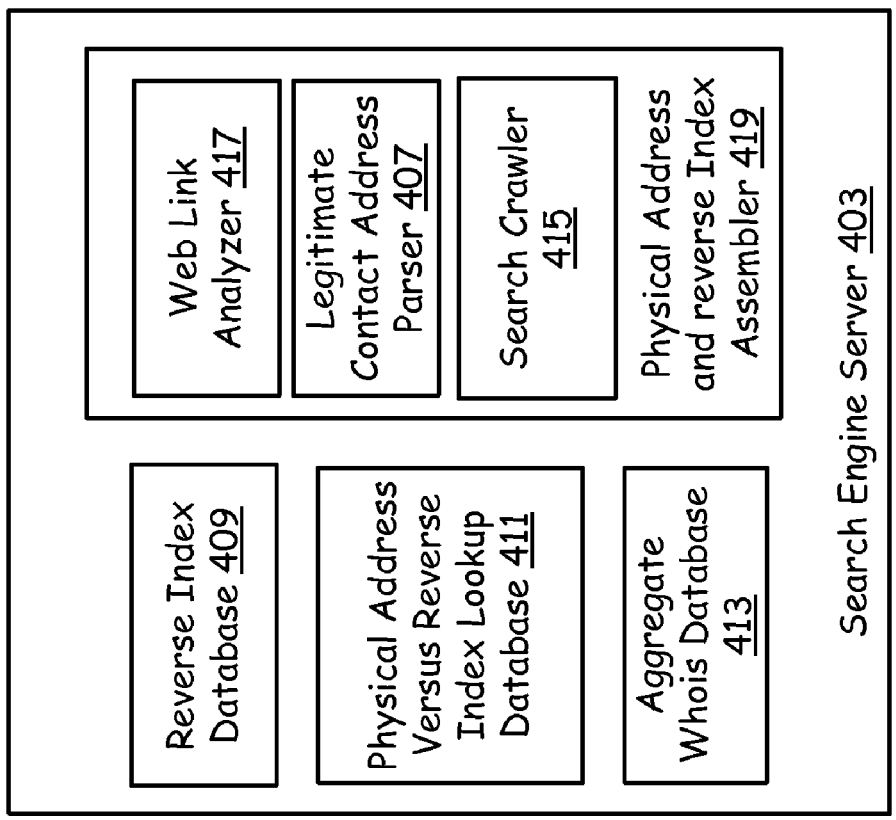
FIG. 4 is block diagram illustrating the generation of a "Physical address versus reverse index database" and "reverse index database" using the "Physical address and Reverse index assembler" module of the search engine server.

The reverse index database 125 is generated during the crawling operation performed by a search crawler 415 of FIG. 4 that is a sub-module of "physical address and reverse index assembler" 147 of FIG. 1. Not all the entries in the reverse index database 125 are legitimate searchable items, as there are items therein that are pertaining to the illegal or illegitimate websites previously discussed. The physical address versus reverse index lookup database 115 is derivative of the "reverse index database" 125. The entries in the "physical address versus reverse index lookup database" 115 are augmented with the legitimate contact addresses derived by the "legitimate contact address parser" 407 of FIG. 4. Therefore, the entries in the "physical address versus reverse index lookup database" 115 associated with the legitimate contact addresses are the legitimate websites with authentic registration, and the rest or remaining entries in database 115 are all squatters which are filtered during a search operation, in accordance with one embodiment taught herein.

The sub-modules of "physical address and reverse index assembler" 147 of the search engine server 109 performs the function of generating the "physical address versus reverse index lookup database" 115. During a search operation if a webpage based contact address is determined to be not correlating with the contact address located in the physical address versus reverse index lookup database 115 entries; those websites are automatically filtered from being presented to the user, as they are illegitimate, unregistered, squatter, unwanted, or like sites. The contact address correlator module 149 does the function of address correlation and filtering of squatters as explained later with the FIG. 7.

The adaptive search module 143 performs the required mathematical and/or logical operations for restricting searches to within the user specified search region. In one embodiment, the adaptive search module 143 performs this operation interactively with the user. The user can change the shape and size of the search region using dropdown menus and popup windows or graphical user interfaces and functions as explained later with respect to FIG. 8. The search list that is presented to the user then gets adapted with any changes or updates performed in the search region.

The Topography-location assembler 131 generates the various views requested by the user by sending various view requests via view information receiver 129. Various databases are superimposed to generate the requested search or graphical user interface (GUI) views on the client device's display. In one embodiment, it is possible to know the location of the mobile user using a search engine server module called "location finder or receiver" 137. A button interface to the user from the search engine window facilitates the retrieval of a mobile user's location on the world map in a user selected search region on the world map, in accordance with one embodiment. If the user is connected to the Internet via WiFi, WiMax, 3G, or other wireless protocols or a third party wireless network, then the GPS location of the user can be derived or triangulated by the received or transmitted signal processing coming to and from the mobile device. The location finder or receiver 137 retrieves the user location based on the IP number of the machine or device through which the user is connected to the Internet.

The "search string and search region size receiver" module 133 of FIG. 1 receives one or more user-entered search strings from the client device. According to one embodiment, the restricted search region shape and size can be provided to the search engine via the "search string and search region size receiver" module 133. The user selects the shape of the search domain, such as a square, rectangle, circle, ellipse, custom shape, segmented plurality of shapes, etc., from a dropdown menu or graphical user interface (GUI) in the search engine window from the client device. Subsequently, if not done on a mouse or stylus interface, a pop-up window prompts the user to enter the dimensions of the search domain, such as the side of a square (L), length and width (L, and W) of the rectangle, radius (R) of the circle, major and minor axes ("a", and "b") of the ellipse, etc. Another option to specify the region restricted search operation is the complete World Wide Web, where the search is performed over the entire Internet. In other embodiments, searches can be specified by other geographic limiters like zip code, county lines, countries, etc.

During an Internet search session, search results are generated and displayed on the client device's screen. The "current session search result list" 139 is the search results generated for the currently-entered search string, and these search results are displayed on the client device in text lists, on a reference map, or in some other form.

Figure 2:
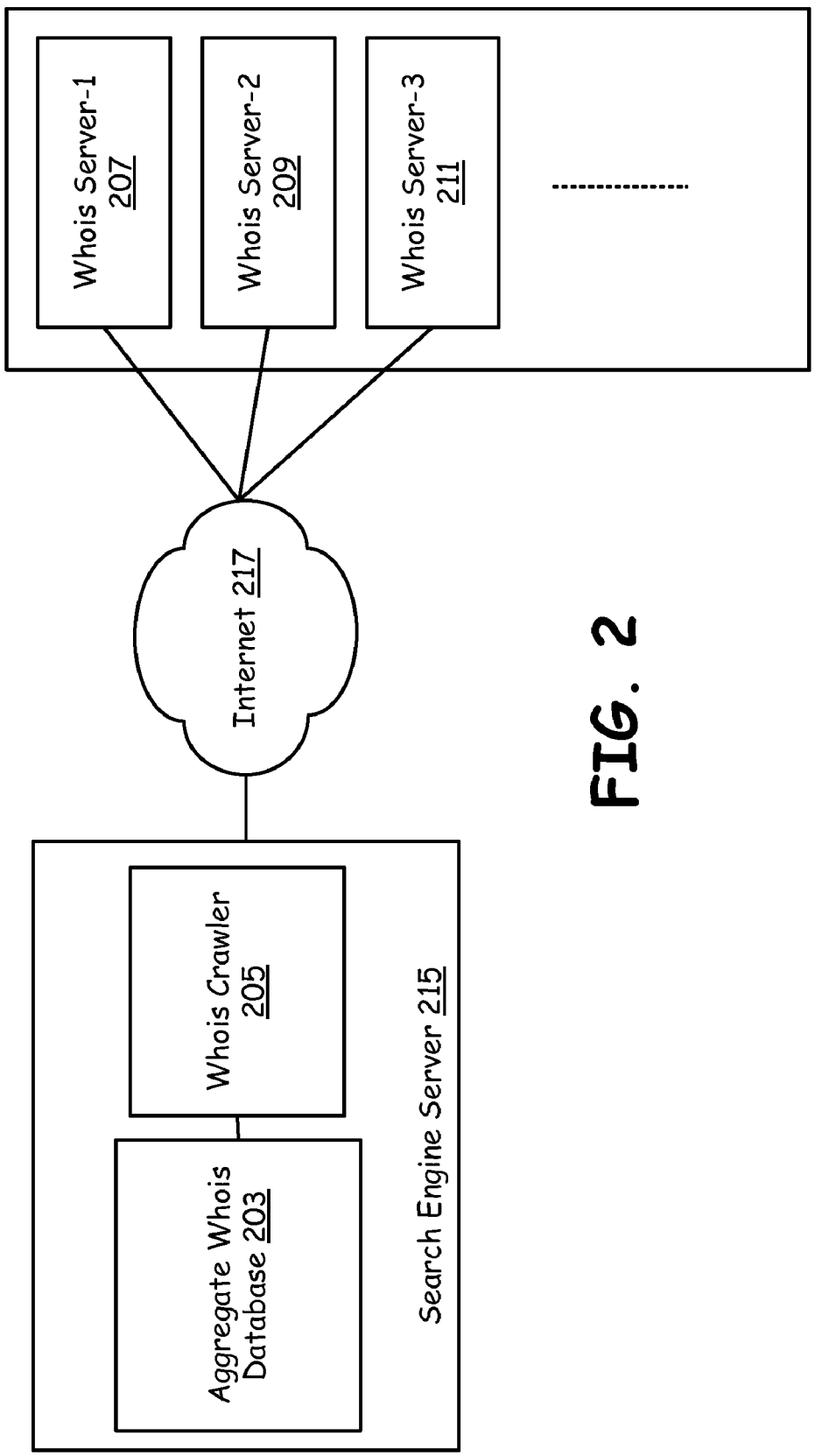
FIG. 2 is a block diagram illustrating the generation of an "aggregate whois database" derived from a plurality of separate whois databases maintained by different service providers.

FIG. 2 is a block diagram illustrating the generation of an "aggregate whois database" 123 (see FIG. 1) as derived from a plurality of whois databases maintained by different service providers over the Internet, in accordance with one embodiment. There are typically a large number of whois database servers created and maintained by different service providers over the Internet and related/connected networks. Each one of these servers may be located at different geographic locations around the planet. In order to use these distributed databases for the purpose of search operations as taught herein, it is sometimes helpful to pool all the databases together to get a single database called herein as an "aggregate whois database" rather than constantly processing widely distributed databases all over the planet.

The process of pooling the multiple databases and the reformatting the data into a central whois database 123 in FIG. 1 is done by a module called a "whois crawler." The whois crawler is run by one or more servers and rearranges the pooled database items, preferably in a central location or a few close-proximity locations. To remain efficient on crawl time, resources, and bandwidth, the whois crawler also extracts only the essential or search-useful pieces of information that are required during an Internet search operation. The useful pieces of information extracted include all information needed to identify the nature of the business that a registered business firm is doing along with all or many of the forms of contact information.

In general, the generation of an "aggregate whois database" involves retrieving whois data from a plurality of whois databases maintained by different service providers, and quite often the whois databases are accessed via an associated whois server. A plurality of whois servers 207, 209, 211, etc. in FIG. 2 are connected to the search engine server 215 via the Internet 217 (which is Internet/network 105 of FIG. 1 repeated). the search engine server 215 is a portion of the server 109 shown in FIG. 1 or is a separate server or plurality of servers/blades/units associated with the server 109. The whois crawler 205 of FIG. 2 crawls through all the existing whois servers and gathers useful pieces of information to build an aggregate whois database 203 that is then used as the whois database 123 of FIG. 1.

Figure 3:
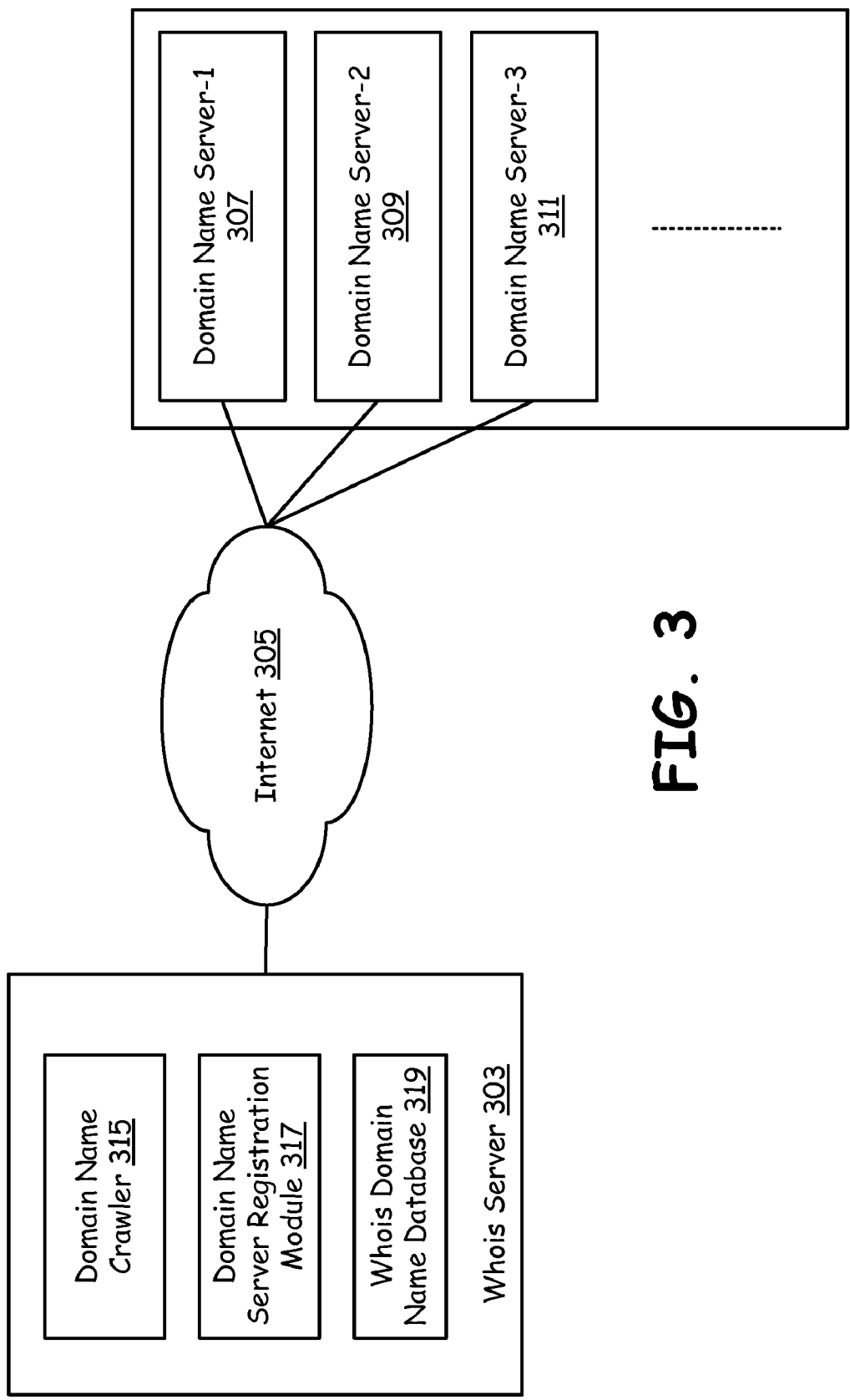
FIG. 3 is a block diagram illustrating a plurality of domain name servers communicating to a whois server, wherein the whois server monitors domain name registration and gathers relevant data.

FIG. 3 is a block diagram illustrating a plurality of domain name servers that are connected to a whois server, wherein the whois server monitors domain name registration and gathers relevant data associated therewith, in accordance with one embodiment. There are web servers maintained in different domains that get crawled during a search operation. All the web servers are registered on their domain name servers, in accordance with whichever domain they belong to. A "domain name crawler" 315 crawls through all the registration information from each of the "domain name servers" in the set of servers 303 in FIG. 3, and builds a whois database in an automated manner, which comprises the whois domain name database 319, in accordance with one embodiment herein. An automatically built/managed whois database can be further reformatted manually or by automated software to suit further and/or additional crawling processes that aid in the building of an "aggregate whois database."

In general in FIG. 3, a plurality of domain name servers 307, 309, 311, etc., is communicatively coupled with a whois server 303 via the Internet 305 (105 of FIG. 1 repeated). A "domain name crawler" 315 from the whois server 303 will crawl for all the registration information and details from each of the plurality of domain name servers 303, which includes the server 307, 309, 311, etc. The resultant database is the "whois domain name" database 319. This topology of FIG. 3 automates the collection of whois database information for the system of FIG. 1. The final whois database will be crawled by a whois crawler 135 of the search engine server 109 of FIG. 1, resulting in the aggregate whois database 123 of FIG. 1.

FIG. 4 is block diagram illustrating the generation of a "Physical address versus reverse index database" and "reverse index database" using the "Physical address and Reverse index assembler" module 147 of the search engine server of FIG. 1. A normally generated "reverse index database" has links pointing to the web servers. It does not have any explicit or direct information on the geographical location of a business firm to which the webpage of the web link belongs. An additional database is thus required which will augment the entries of the reverse index database with the legitimate contact address. The legitimate contact address is the output of a parsing of the "aggregate whois database" record(s) of a business firm. In one embodiment, the "search crawler" which builds the "reverse index database" is the part of the "physical address versus reverse index lookup database" 115 of FIG. 1. The "search crawler" builds the "reverse index database." The Web link analyzer module associates the web links in the reverse index database entries with the corresponding "legitimate contact address" and generates the "physical address versus reverse index lookup database."

Now this explanation of FIG. 1 is tied to specific pieces illustrated in FIG. 4. The search engine server 403 (analogous to server 109 of FIG. 1) manages the generation of a "Physical address versus reverse index database" 411 (analogous to database 115 of FIG. 1 repeated) and "reverse index database" 409 (analogous to database 125 of FIG. 1) using the "Physical address and Reverse index assembler 419 (analogous to the assembler 147 of FIG. 1) module of the search engine server. The legitimate contact address parser 407 parses and extract the legitimate contact address from the aggregate whois database records corresponding to the business search string that appears indexed in the reverse index database 409. Search crawler 415 crawls the Internet as previously described.

The "web link analyzer" module 417 associates the legitimate contact address that was parsed with the web link of a searchable string (search string). An aggregate of augmented searchable string(s) and web link entries gives rise to a new database called "physical address versus reverse index lookup database 411 (analogous to database 115 of FIG. 1). The entries in the "physical address versus reverse index lookup database" 411 have all the necessary information for each of the entries such as a link that points to webpage and legitimate contact address that points to a unique geographical address or (GPS) coordinates of that business firm that has hosted its webpage on a web server. This information can be used to perform geographically limited or specific search operations and authenticate commercial, business, or other search results as legitimate.

Figure 5:
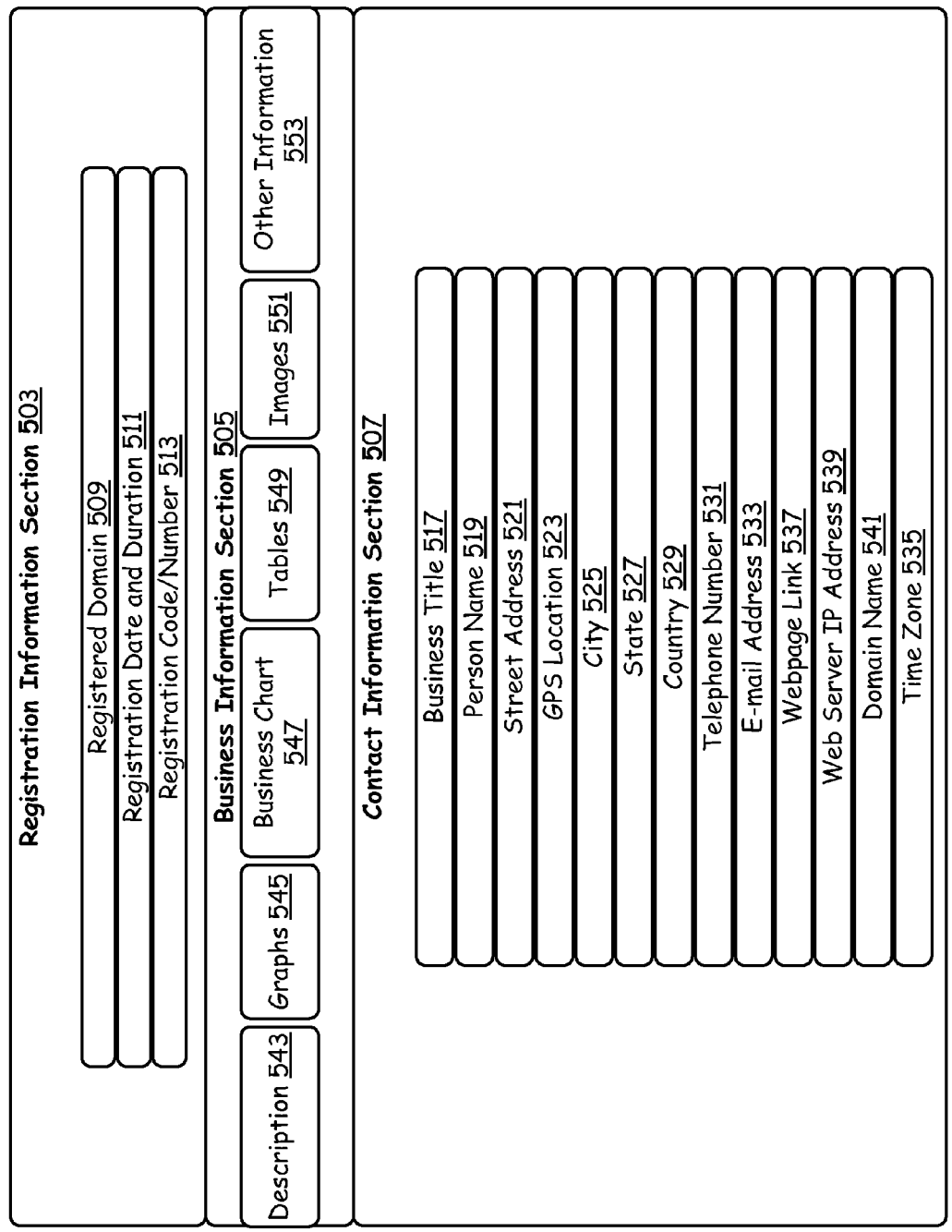
FIG. 5 is an set of registration information with associated formats collected from business registration information, such as those provided to domain registration servers and those maintained by a whois database.

FIG. 5 is a set of registration information 501 with associated formats used to collect business registration information, such as those provided to domain registration servers and those maintained by a whois database. Such a set of registration information can be displayed, if necessary, in an output record viewed in a network browser window, in accordance with the embodiments taught herein. The "legitimate contact address parser" 407 of FIG. 4 and that is associated with a search engine server extracts the fields in the contact information section provided by whois databases or retrieved by a whois crawler. In one embodiment, registration information will also be parsed and extracted to the record of aggregate whois database, which will help in proving the registration authenticity of the business firm. A typical business information record contains a "registration information section," a "business information section," and a "contact information section" as shown in FIG. 5.

The registration information section 503 has all the business registration related information, such as the domain name 509 in which the website is registered and hosted, valid registration date 511, registration code/number 513, etc.

The Business information section 505 contains a complete description of the business that includes detailed textual description of the business 543, graphs 545, business charts 547, tables 549, images (of the products) 551, and other information 553, etc. The information in this section may be graphical, pictorial, video-based, text, spreadsheets, PDFs, or other types of information.

The contact information section 507 of the business registration information record contains all the information that helps in contacting a firm in all the possible forms (e.g., email, P.O. box, physical address, GPS coordinates, zip code, etc. This information includes the title of the business 517, person's name to contact 519, street address of the business firm 521, GPS location of the business's firm's premise 523, city 525, state 527, country 529, telephone number 531, e-mail address 533, time zone 535, web link (webpage) 537, IP (Internet protocol) address of the web server 539, DNS (Domain Name Server) name of the web server 539, etc.

The typical content and associated format of a business registration information record of a business firm provides several categories of information when retrieved or searched on a whois database, or viewed in a network browser window. The registration information section 503 has registration number domain name 509, valid registration date and duration 511, and registration code/number 513. The registration number is a unique number that identifies the registered firm uniquely in the whois database. The registered domain name is the name of the Internet domain and type such as a name that ends in .net, .com, .org, etc. The registration duration is the period until the whois database registration remains valid, as per the subscription.

The business information section 505 has all the business details that a firm wishes to disclose publicly for promoting its business. The textual description 543 describes the nature of the business of the firm. Other pieces of information that a firm may wish to publicize are data in the form graphs 545, data in the form of one or more business charts 547, data listed tables 549, images 551 of the products, etc. And apart from and in addition to these fields is any other information 553.

The contact information section 507 contains all the information of contact details through which one can reach a corresponding business or firm and inquire about their requirements. Business title 517 is a field that describes the name of the business firm, as registered or publicly advertised. A person or executive name 519, i.e., the responsible person's name for the firm or a spokesperson or PR contact of the organization or the firm. Street address 521 is the physical or geographical address of the street and location of the firm. Global Positioning System (GPS) location 523 is a useful piece of the information that is provided and is the GPS coordinates or location on which the business firm premise is situated. The city 525 is the city in which the firm is located. State 527 and country 529 are the state and the country to which the firm belongs to, and situated in.

Telephone number 531 (including fax number if applicable) is another useful piece of information through which one can instantly reach the business firm and enquire on the business details. E-mail address 533 field of the contact information is used for written or email correspondence. Web link 537 is the URL (Universal Resource Locator) of the business firm. Web server IP address 539 is the identification of the server that hosts the home web page(s) of the business firm. The domain name 541 is the name of the web server on which the business firm's webpage is hosted on Internet. Time zone field 535 lets somebody know the working office hours of the business firm or business organization/company.

Figure 6:
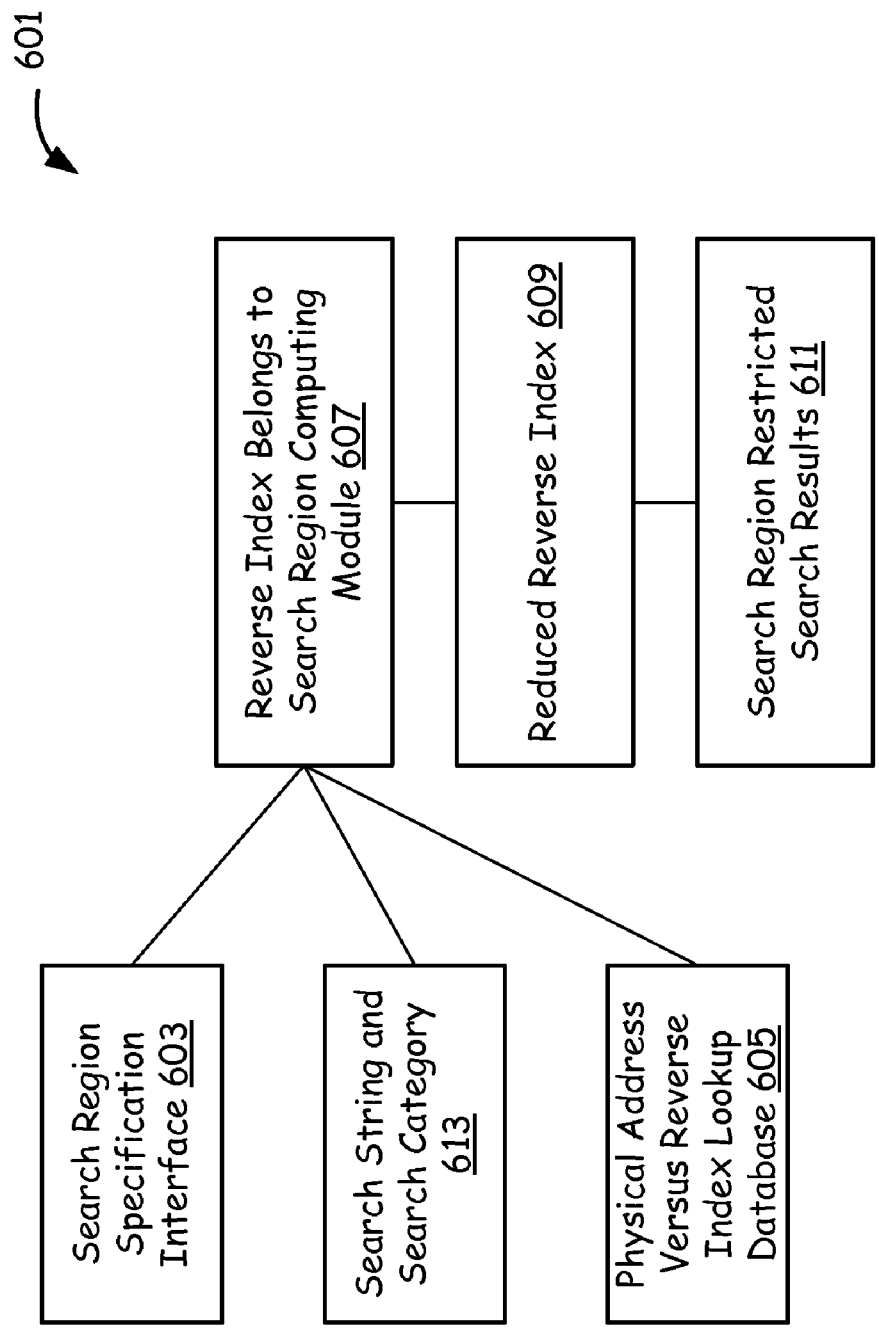
FIG. 6 is a perspective block diagram illustrating the interactions of an "adaptive search module" of the search engine server for implementing search region restricted search operation.

FIG. 6 is a perspective block diagram illustrating the interactions of an "adaptive search module" 143 of the search engine server 109 of FIG. 1 for implementing search region restricted search operations, in accordance with the geographic limiting searching taught herein. The search region restrictions facilitate a contextual search operation. Unlike predefined search region restriction in the currently available search engines, the user defined search region restriction facilitates on-the-fly change of the search region, arbitrarily, and on one or more of many dimensions (e.g., geography, language, time, etc). Also as the user's interaction inputs are preprocessed during the search operation, a lot of junk search traffic is eliminated, in accordance with the embodiments taught herein. When the search string and the region of the search is interactively provided by the user, only those results that fall in the search region are retrieved into the search list, thus avoiding unnecessary searches or search results in areas/regions that are of no interest to the user.

An algorithm implements the intersection of the search region with the searched location addresses for a given search string all over the world, and finally results in the formation of a search list that contains a subset of the search results that fall within the specified searched region in the form of reduced reverse index. It is basically those legitimate contact addresses (Cartesian or GPS longitudinal and latitudinal, coordinates) of the searched business firms from within the search region that is of relevance to the user and all other material should be removed from presentation in the search result list in a preferred form. The algorithm checks whether an address belongs to the specified search region or not. If the address belongs to the search region set by the user or search or favorably correlates with it, that web link is retained in the search list otherwise it is not listed. To implement this algorithm we have three inputs: a search region specification interface with the user, search string and search category, and the "physical address versus reverse index lookup database" 115 of FIG. 1. The entries in the "physical address versus reverse index lookup database" are basically grouped subsets of a search string and multiple web links with each web link associated with the corresponding legitimate contact address. The "reverse index belongs to search region" computing module 607 of FIG. 6 picks only those entries in the database that belong to the search region, resulting in a "reduced reverse index" subset of search results for a given search, i.e., a small subset of the original database that was searched/used. The "reduced reverse index" database points to those websites in the specified search region.

The block/step diagram 601 of FIG. 6 illustrates the functionality of an "adaptive search module" 143 of the search engine server 109 of FIG. 1. The search region specification interface 603 of FIG. 6 provides the user interface from a search engine window on the client device, and this module proves input to the "reverse index belongs to search region computing module" 607. The physical address versus reverse index lookup database 605 is another input to module 607 as shown in FIG. 6. A third input to 607 is the user entered "search string and search category" 613 which defines the context or scope of a search by a user.

The "reverse index belongs to the search region" computing module 607 generates the "reduced reverse index" 609, as a selected subset of the database 605. The web links corresponding to the entries in the "reduced reverse index" 609 constitutes the "search region restricted search results" 611 and are displayed on the world map within the search region on the client device from where the user is performing the search operation. Search results can be displayed graphically on a map, pictorially on a GPS satellite picture, in a list, or per other user interfacing methods.

Figure 7:
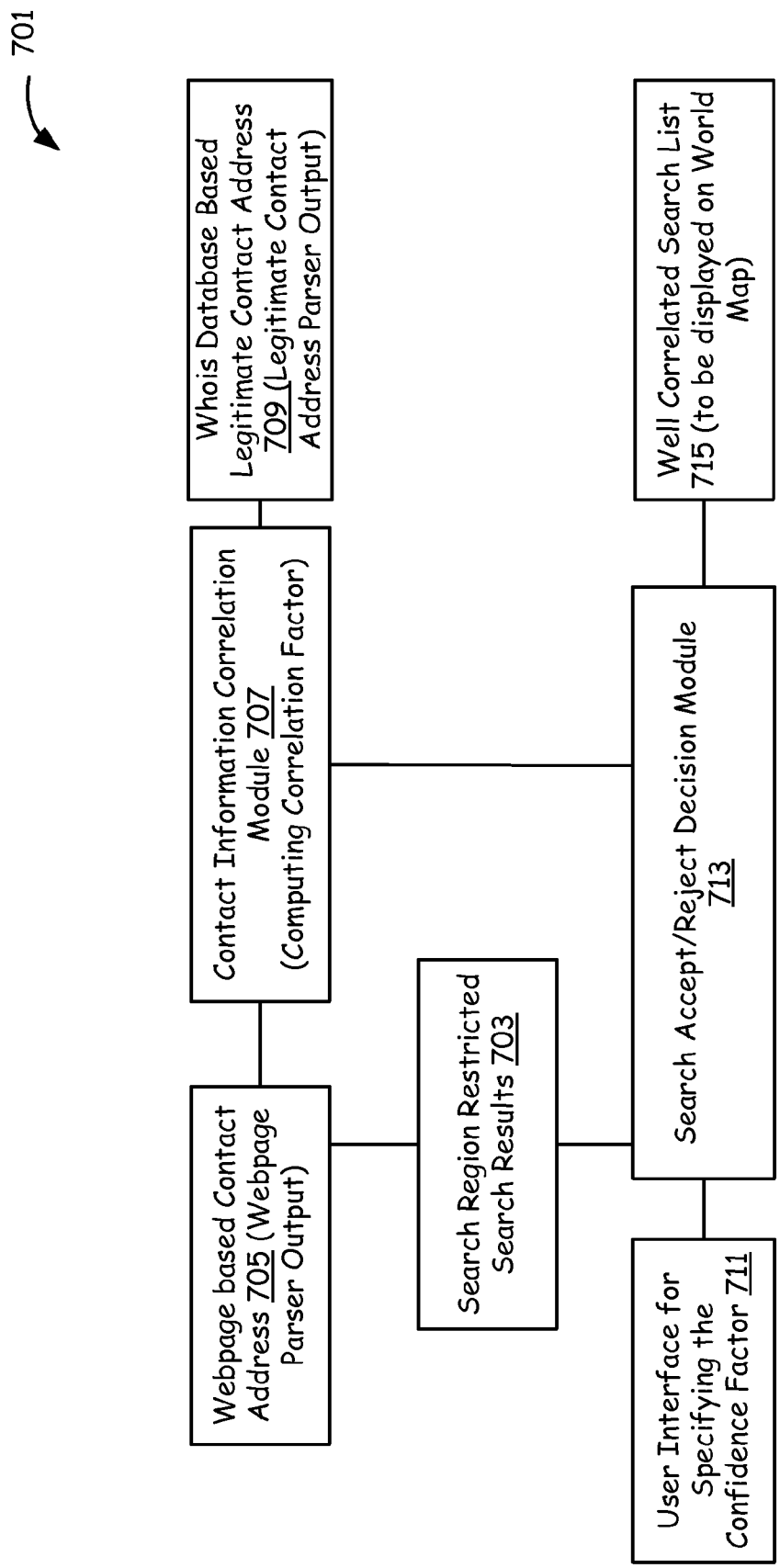
FIG. 7 is a flow chart illustrating a function of "contact address correlator module" of the search engine server.

FIG. 7 is a flow chart illustrating the function of "contact address correlator module" 149 of the search engine server 109 of FIG. 1. Therefore, the process of FIG. 6 finds search results that are limited within the geographic or other confines of the search, and the process of FIG. 7 allows the server to limit the search results to only legitimate search results so that illegal, dangerous, illegitimate, etc., sites are not presented to the user as legitimate sites. The principle of operation explained in this FIG. 7 allows the server to check whether the selected web link in the search region for the currently entered search string is legitimate or not. The legitimacy of a web link and the content found therein is checked against its registration information in the whois database, (or the aggregate whois database of FIG. 1). The legitimacy is tested by comparing two pieces of address records, one derived from the webpage of the search item and the other derived from the aggregate whois database. A "contact information correlation module" correlates the two address components (the address found in the search result web link and the address found in the whois database) and computes a correlation coefficient as its input.

The "search accept/reject decision module" decides whether the webpage/web-link can be retained as a legitimate web site in the 'search region restricted search list" 703 or not. The decision is made using a user-entered or default machine defined confidence level factor through an appropriate interface provided in accordance with FIG. 1. Those correlation coefficient values which are greater than or equal to the confidence level factor are retained in the "search region restricted search result" list, other search results that have coefficient values below a confidence level are removed generating a "well correlated search list" 715 displayed on the world map or other user interface (whereby illegitimate web search results below the default/user's confidence level are removed).

The block diagram 701 of FIG. 7 illustrates the function of "contact address correlator module" 149 of the search engine server 109 of FIG. 1. The "search region restricted search results" 703 (same as results 611 of FIG. 6 repeated) is provided as input to the "webpage parser" 141 of FIG. 1, which extract and gives rise to a "webpage based contact address" 705 in FIG. 7. The webpage based contact address 705 acts as one input of the "contact information correlation module" 707. Another input to 707 is the "whois database based legitimate contact address" 709 in FIG. 7. The "legitimate contact address" is the output of "legitimate contact address parser" 407 module of FIG. 4. The "contact information correlation module" 707 compares and computes the "correlation coefficient" between the webpage based contact address and the legitimate contact address.

A "search accept/reject decision module" 713 compares two inputs, one from module 707 and another from the confidence factor module 711, for specifying, correlating, and resolving the confidence level factor for the legitimacy of this search result. During the comparison of two coefficients, those web links from the "search region restricted search results" 703 having correlation coefficient greater than or equal to user entered confidence factor from module 711 are retained, and other search results that have correlation values below the confidence factor are filtered out to generate a "well correlated search list" 715 (which is then displayed on the world map or displayed via some other format for the user).

Figure 8:
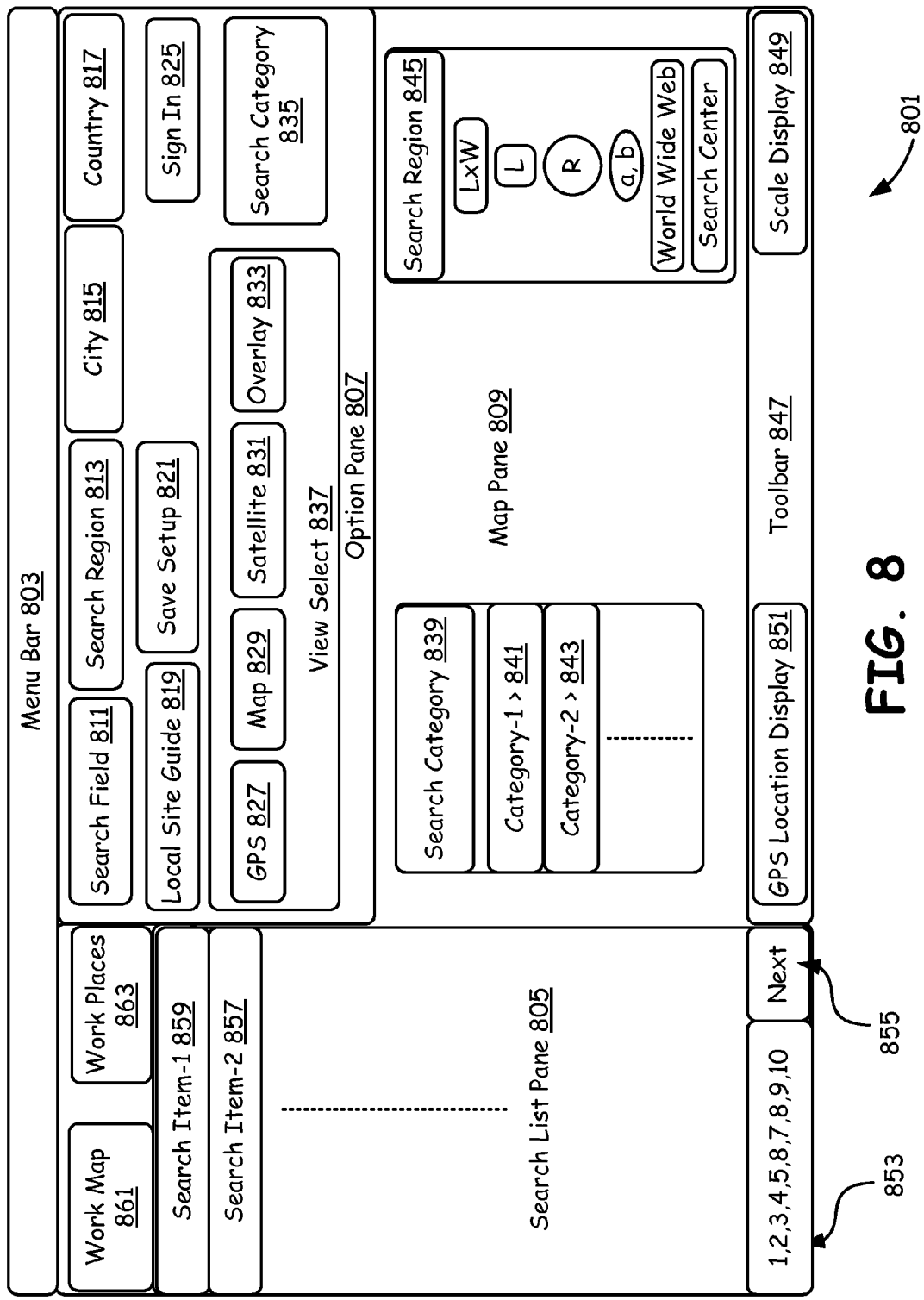
FIG. 8 is an screen snapshot of a world map based search operation supported by a search engine server, built in accordance with the present invention, that incorporates a whois database based search region restricted search operation.

FIG. 8 is a screen snapshot 801 of a world-map-based search operation supported by a search engine server, built in accordance with the prior teachings of FIGS. 1-7, that incorporates a whois-database-based search-region-restricted search operation. An option pane 807 helps a user in specifying various search options, for the view, search category, search region, etc. In a search list pane 805, the searched results are displayed in a text form as group of ten results per view (or some other number that is convenient for the screen size and display area). Next ten results (or a next amount of search results N where N is an integer) can be viewed using the "Next" button provided in the same pane. A map pane 809 displays the selected view of the map (in the image format) along with the search results, as graphically displayed on the map or satellite picture. Normally 10 (or some finite number of) search results can be conveniently displayed from the search list in the search list pane without cluttering the graphics on a normal sized PC or TV screen. In this pane, a user can also setup views and mark his own places and save them as his "work map" and "work places" for later reference. A menu bar 803 has all the general purpose menus available and the tool bar contains the tools for setting the right view on the map, along with the display such as GPS coordinates and the current scale of the map, etc.

The screen snapshot 801 provided by the search region restricted search engine makes it possible for a user to manage the search process in an efficient manner. The menu bar 803 contains all the menus commonly used in a network browser in which the search engine is opened (e.g., file menus, format menus, help menus, view menus, etc). The search list pane 805 has all the search results listed in the order, as shown in the figure. The Search item-1 (859), search item-2 (857), etc. in the search list are ordered with a priority determined by an internal search criteria such as the frequency of the search string on the webpage, popularity of the webpage/search result, etc. At the bottom of the search list pane 805 is contained the search list groups 853 with numbers assigned. Each group typically has 10 (or some other finite number of) web links in it. The number of web links in a group can also be set to a user defined number, and the user can use this area to click and select different groups of search results. The user can switch to the next group in the order by mouse clicking the "Next" button 855. The search list pane also includes some of the special buttons that allow the user to personalize the search items for later references. The work map button 861 allows a user to store the map; normally the user uses this button to add markers on the locations of his interest on the map for a quick search at a later time. Another button is the work places button 863, which allows the user to save his search results on the map to his favorites data within the search browser.

The option pane 807 enables the user to set settings of his choice on the map during the search session. Also once settings are set, they can be retrieved automatically during later search sessions, like a user search profile/setting. The search field 811 is the place where the user enters his search string for the search operation. Further, the user may enter the name of the city in the field 815, and the country in the field 817 if he wants to do search in some predefined locations on the map. Other geographical limiters can also be placed in FIG. 8 as an option, such as zip code, telephone directory limitations, GPS coordinates, longitude and latitude, etc. The user provides the search region for the restricted search region using the button 813, which results in popping up of a search region menu 845 or a graphical user interface 845 that allows the user to trace the geographical limitations on a map or satellite picture. From the search region menu in one embodiment, the user can select various search domain shapes such as a rectangle, square, circle, ellipse, World Wide Web, and search center and limit searches over areas included within the shapes or excluded from those shapes. During this selection, the user will be prompted to enter the dimensions of the search domains, such as length (L) and width (W) of the rectangle, sides of the square (L), radius (R) of the circle, major axis (a) and minor axis (b) of the ellipse, search center coordinates, etc., and the placement and use thereof (does the server include or exclude search results in this region)

The "sign in" button 825 enables the user to sign in for the subscribed search services. Once signed in, the user has access to all his previously subscribed services, with his work map, work places, etc., becoming accessible. From there a user can pay and subscribe for the services or renew expiring services, etc. The user will also retrieve all his personalized work maps 861 and work places 863 etc., saved from this location, once signed in. All the personalized setups can be saved after signing in, using the button save setup 821 for later retrieval.

Searches can be categorized using the search category 835 button. Upon mouse clicking this button, a search category menu 839 pops up for display to a user. Each of the search category items in the search category menu 839, such as category-1 (841), category-2 (843) etc., results in further sub menus, wherein the user can choose the subcategories. The choosing of one or more subcategories this makes the search more and more context based. The search category list contains exhaustive lists that can also be further expanded depending on the emergence of new category (e.g., new categories of business, etc.).

When the user does the restricted region search operation, for example, a search over a city; he can search for specific category of amenities in that location based on his needs. The local site guide button 819 facilitates this feature to the user to access the location amenities offered by some of the service providers registered in that location (or site). Also, the local site guide 819 may allow an aggregator service to subscribe businesses to a for-profit service where the business register and classify themselves for coordinated use within the GUI of FIG. 8 so that they are favored or specially referenced when searches are performed for some users.

The view select sub-pane 837 facilitates the user to select the world map view options, communicated to the search engine server 109 of the FIG. 1. If the user has mouse clicked on the GPS button 827, then the GPS location of the cursor point on the map will be shown in the bottom toolbar menu 847 on the GPS location display 851. The GPS coordinates are updated when the cursor moves from one location to next, and so on. The coordinates in terms of longitude and latitude of cursor point on the world map (view) are displayed on GPS location display 851, in the tool bar 847, in one embodiment. On one side of the toolbar 847, various world map display scale information 849 will be displayed in all the zoomed-in and zoomed-out views that are available.

Choosing map 829 options from the view select sub-pane 837 displays only the bare map (with political boundary information or other optional map information). If user selects satellite view 831, the earth's satellite view will be superimposed on the world map or replace the map view. If user wants all the three view options viz., GPS 827, Map 829, and satellite 831 views to be superimposed, he can then select overlay button 833 by mouse clicking.

Figure 9:
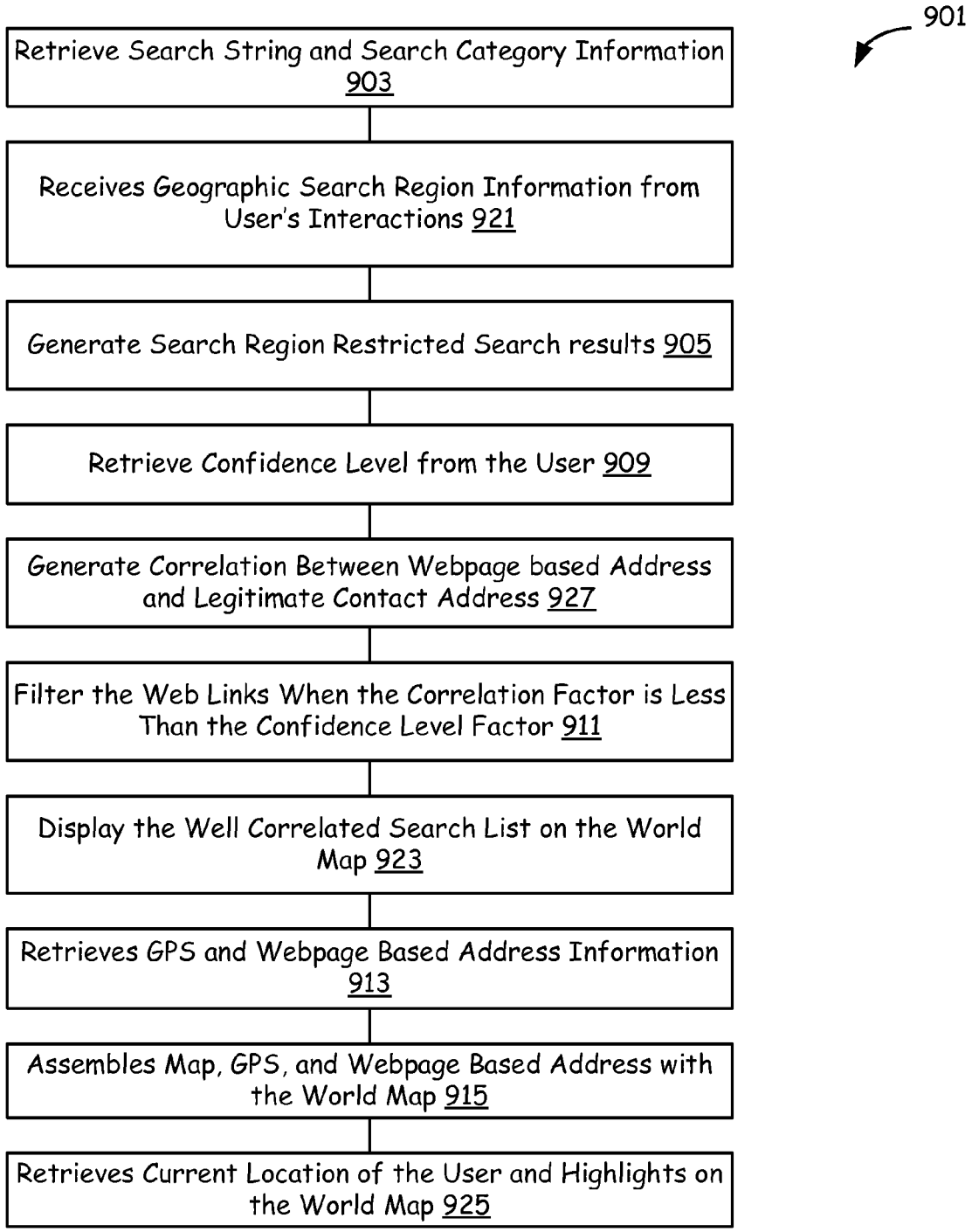
FIG. 9 is flowchart illustrating an operation of the search engine based on whois database, in accordance with the present invention.

FIG. 9 is flowchart illustrating one operation of the search engine server, based on whois database in accordance with FIGS. 1-8. The method of operation 901 performed by the search engine begins at a block/step 903 with the retrieval of the search string, search category, and search region delineation provided interactively from the user on a client device. Then, at a next block/step 921, the search engine generates search results from within a search region selected by the user, like a rectangle, a square, a circle, an ellipse, GUI-defined area, inclusion or exclusion regions, and/or all World Wide Web, along with their dimensions and limitations. In the next block/step 905 a "search region restricted search results" 611 will be generated as taught in FIG. 6.

Then at a next block/step 909, the confidence level value is specified by a user or provided as a default and retrieved by the system. This value is used as a threshold to filter out some websites based on a legitimacy value or some other numerical rating that is computed. The search results are further filtered, at a next block/step 927, based on their legitimacy. The determination of legitimacy depends on their domain name registration being crawled and stored and correlating favorable to actual web page search results contact address information found via the Internet search operation. Prior to displaying the search results on the map, all the useless and misleading websites and those that add limited value and squatter's sites are filtered from the search results. These illegitimate or filters websites or search results may be shown to a user just in case a mistake was made, however, these displays will be clearly marked/identified so that the user knows these sites may have security or authenticity issues.

At the block/step 911, the filtering operation requires that the user enter a confidence factor interactively in step 909. This factor is compared with the computed correlation factor between the "webpage based contact address" and the "legitimate contact address." If the computed correlation factor is greater than or equal to the confidence level factor, those web links will be considered for display in the search result list. The search engine retrieves various databases that are required to generate the user requested view in the map pane 809 of FIG. 8. The topography-link assembler module 131 of FIG. 1 assembles all the data sets from different databases like GPS, map, and satellite databases to generate the requested view in the map pane 809. A satellite picture of the earth's surface overlaid on the map gives a more realistic view to the displayed search results. The search engine highlights all the displayed items within the selected search region, and may tag them with useful graphical or textual information. The current location of the user will be found or received and physically mapped on the world map, if requested, in accordance one embodiment.

Another method of operation performed by a search engine server to facilitate the search region restricted search operation comprises several steps of filtering out unwanted or useless websites, weeding out potential spam websites, etc. The search engine receives the search string and the search category information at a block/step 903. Subsequently, at a next block/step 921, it receives the geographic search region information such as the search region dimension and its shape. At a next block/step 905, it generates the search results by executing the "adaptive search module 143 of FIG. 1 with "physical address versus reverse index lookup database" 115 of FIG. 1 as input. Then the search engine performs the search operation at 905 and generates the search result list. The search results that are obtained at block/step 905 are the "search region restricted search results" 611 as discussed with FIG. 6.

Then, at a next block/step 909, the user's specification (or a default specification) of a confidence level factor is received. The filtering operation requires that the user enter a confidence level factor interactively at block/step 909. This factor is compared with the computed correlation factor between the "webpage based contact address" and the "legitimate contact address" at a next block/step 927. If the computed correlation factor is greater than or equal to the confidence level factor those web links will be considered for display in the search result list, otherwise it will be filtered out at the block/step 911. The search results at this stage are the "well correlated search list" 715 of FIG. 7, displayed on the client device at 923.

The search engine server retrieves the GPS database 113 and physical (or legitimate contact) address information at the block/step 913. Next, the search engine sever assembles the GPS database 113 and the physical address from location database 111 of FIG. 1, at the block/step 915. Subsequently, the requested view of search results will be assembled by topography-link assembler 131 of FIG. 1 at the block/step 915. The view of the map display will be modified using the GPS database 113, map database 119, satellite database 121 of FIG. 1, at the next block/step 925 if the satellite image of the earth's topography is requested by the user.

Figure 10:
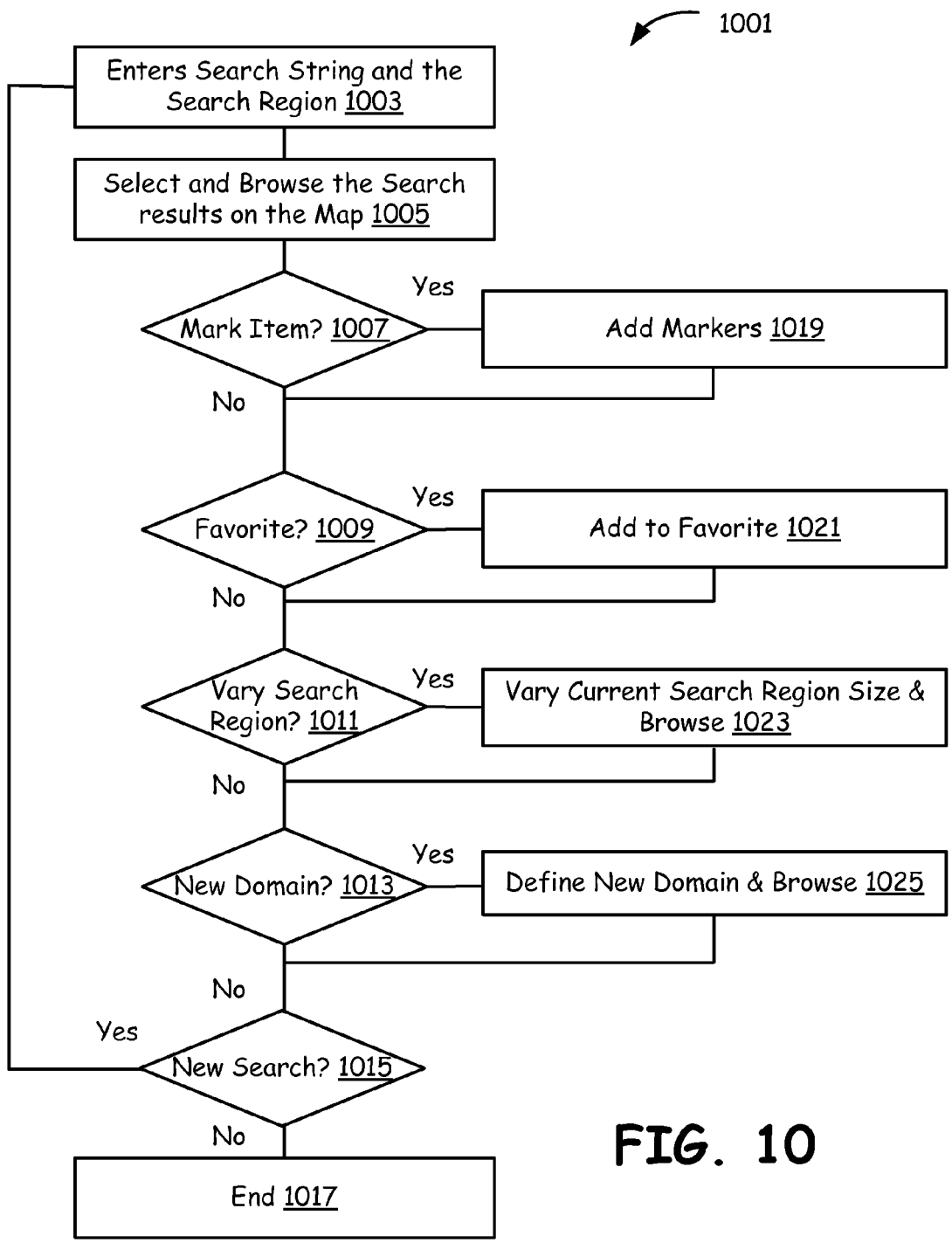
FIG. 10 is flowchart of a method of operation, performed by a user, in using the whois database based search engine, in accordance the present invention.

FIG. 10 is flowchart of a method of operation 1001, performed by a user, when using the whois database based search engine, taught herein. The user typically performs the following sequence of operations using a "search restricted world map based search engine." The search operation starts with the user entering the search string and category, and defining the search region from the search engine window on the client device. Then, the search engine returns the search results from within the search region chosen by the user on the world map. In this process, due to the use of the internal reference aggregate whois database, all the unwanted sites are automatically filtered or especially tagged/identified, as explained earlier with respect to FIGS. 6 and 7 and the method of FIG. 9.

Subsequently, a user can perform the required search result interaction with the websites indicated on the world map. A User may want to know more about the website he has visited, and also add markers to indicate his own landmarks and references on the world map and save them for later references. He can personalize the search settings and current views and save them for later search/use sessions.

The method 1001 starts at the first block/step 1003 where the user enters a search string. The user's interactions with the search restricted search engine server that are used for personalizing the search views and the search session setup are of interest in this method. A user enters the search string and search region or domain at the block/step 1003 into the search engine. In response to this, the search engine returns the search results and displays them on the world map within a region restricted or defined by the user. The user selects the displayed search items and browse at the next block/step 1005 for more information.

During the browsing operations a user can interact with the search engine in number of ways. In accordance with one embodiment, a user decides to mark a place on the map at the next block/step 1007, then if he so desires, he adds a marker at the next block/step 1019. If the user subsequently wants to add the site on the map into the favorite list he adds this at a next block/step 1021.

Once the search results are generated, the user can vary the search region or the domain size, and see if there are any interesting or more focused search items in the newer (bigger or smaller) search dimensions. A user may decide to vary the search domain size at the next block/step 1011, if required he will vary the current search region size at a next block/step 1023. If the user altogether wants to try a different search region shape from the previous choice, (for e.g. rectangular domain replaced by a circular one), the user decides at the next decision block/step 1013; if a user wants to, the user then defines new domain at a next block/step 1025; else the operation, based on the user's choice, moves to the next decision block/step 1015.

At the block/step 1015, the user may decide on whether they want to conduct a new search, (probably, by a new search string); if the user so desires, the user enters a new search string and new search domain at the next block/step 1003 again, and repeats the whole sequence of the method of operation. Else, the search ends at the next 1017.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description, and can be apportioned and ordered in different ways in other embodiments within the scope of the teachings herein. Alternate boundaries and sequences can be defined so long as certain specified functions and relationships are appropriately performed/present. Any such alternate boundaries or sequences are thus within the scope and spirit of the claimed invention.

The present invention has been described above with the aid of functional building block/steps illustrating the performance of certain significant functions. The boundaries of these functional building block/steps have been arbitrarily defined for convenience of description. Alternate boundaries could be defined as long as the certain significant functions are appropriately performed. Similarly, flow diagram block/steps may also have been arbitrarily defined herein to illustrate certain significant functionality. To the extent used, the flow diagram block/step boundaries and sequence could have been defined otherwise and still perform the certain significant functionality. Such alternate definitions of both functional building block/steps and flow diagram block/steps and sequences are thus within the scope and spirit of the claimed invention. Although the Internet is taught herein, the Internet may be configured in one of many different manners, may contain many different types of equipment in different configurations, and may replaced or augmented with any network or communication protocol of any kind. Furthermore, client devices are often taught and depicted herein as laptop computers or personal computers (PCs), however, client devices can be cell phones, palmtop computers, laptop computers, netbooks, mobile internet devices, point of sale devices, GPS systems, appliances, home security systems, DTVs, set top boxes, portable or fixed game consoles, workstations, supercomputers, other servers, personal device assistants (PDAs), or any other electronic device used by an end user.

One of average skill in the art will also recognize that the functional building block/steps, and other illustrative block/steps, modules and components herein, can be implemented as illustrated or by discrete components, application specific integrated circuits, processors executing appropriate software and the like or any combination thereof. The search results herein are taught as business, organizations, partnerships, stores, etc. It is important to not that when these terms are used, they can mean an individual (e.g., hairdresser, doctor, etc.), partnerships, incorporated business, government entity, foreign corporation, or any other form for conducting business, selling products, or providing services. Furthermore, the order of claimed steps and steps in methods may be changed. For example, it is largely taught herein that search results are first found by finding correlation to a search criteria or string and then limiting those search results by geography. There is nothing preventing this selection process from being done in reverse or another order, for example, all businesses in the geographic area may be found first, and they that list can be limited by applicability to the search criteria.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A search engine server that facilitates searching for content on the Internet, the search engine server comprising:
   a search criteria input to receive a search criteria from a client communicatively coupled to the search engine server;
   a reverse index database that facilitates identification of search results based on the search criteria received, wherein the search results comprise entries that are each associated with a business or an organization;
   organization contact information supplied by a Whois database server communicatively coupled to the search engine server, wherein the organization contact information provides contact information for the business or the organization associated with at least one of the entries of the search results;
   a geographical proximity identifier computed for a user providing the search criteria; and
   wherein the search engine server includes a contact address correlator module to determine correlation data indicating whether a contact address indicated in a webpage identified in the search results is local to a geographic proximity indicated by the user, by comparing the organization contact information supplied by the Whois database server with the contact address indicated in the webpage;
   wherein the search engine server determines whether the correlation data meets a confidence level factor; and
   wherein, subject to the correlation data meeting the confidence level factor, the search engine server restricts the search results to those entries whose associated business or organization location is in geographical proximity to the user conducting the search based on both the geographical proximity identifier that was computed, and the organization contact information supplied by the Whois database server.

2. The search engine server of claim 1 wherein the organization contact information comprises at least one of a city name, a state name, a country code, a telephone number; and a GPS location.

3. The search engine server of claim 1 wherein the organization contact information comprises ownership information for the corresponding domain associated with the at least one of the entries of the search result, the search engine server further comprising:
   the search engine server determining a total number of domains registered by the organization with the same or similar ownership information;
   the search engine server assigning a priority to the corresponding one of the entries of the search result in response to the total number of domains being determined to be over a threshold number; and
   the search engine server employing the priority to determine the inclusion of the at least one of the entries into the search results.

4. The search engine server of claim 1 further comprising:
   a Whois crawler module that assembles an aggregate Whois database from Whois information retrieved from a plurality of Whois databases;
   wherein the Whois crawler module is crawl through the plurality of Whois databases to retrieve the Whois information and populate the Whois database using the Whois information;
   wherein the search engine server retrieves the organization contact information from the Whois database; and
   wherein the search engine server uses the organization contact information aggregated from the plurality of Whois databases to determine whether to include the at least one of the entries of the search results into the search results presented to the user.

5. The search engine server of claim 4 further comprising:
   an adaptive search module to perform searches in response to the search criteria;
   wherein the search criteria is received by the search engine server from the client wherein the search criteria comprises a search string and a search region;
   wherein the search engine server sets a search category information and a search region restriction for the user based on the search criteria; and
   wherein the adaptive search module generates the search results based on the search criteria, the search category information, and the search region restriction.

6. The search engine server of claim 1 further comprising:
   a location finder module generating a geographical mapping information that maps the at least one of the entries with respect to a current location of the user on a map structure; and
   wherein the search engine server communicates the search results with the geographical mapping information to the client.

7. A method performed by a search engine server that is communicatively coupled to at least one client device, the method comprising:

receiving, by the search engine server from the at least one client device, a search criteria comprising a search string and a search region;

assembling preliminary search results using the search region and the search string;

determining whether webpage contact addresses associated with webpages identified in the preliminary search results are local to the search region by comparing the organizational contact address retrieved from a Whois database with the contact addresses associated with the webpages;

creating correlation data based on the determining;

generating a correlated search result list excluding non-geographically relevant search results by using the correlation data and the preliminary search results to identify preliminary search results having webpage contact addresses local to the search region, and wherein the preliminary search results comprise a plurality of targets;

communicating the correlated search result list or a subset thereof out from the search engine server for eventual receipt by the client device for display to a user; and wherein determining whether the webpage addresses are local includes:
  retrieving a user provided confidence level factor;
  comparing the correlation data to the confidence level factor;
  determining whether individual items included in the preliminary search results compare favorably between the correlation data and the confidence level factor.

8. The method of claim 7 wherein the search criteria comprises at least one of the search string, a search category, and the search region, and wherein the search string comprises a plurality of words, and wherein the step of assembling comprises:
  accessing a reverse index database, communicatively coupled to the search engine server, to find the occurrence of the plurality of words in target documents and creating a target search results; and
  factoring in at least the search category and the search region into the target search results to create the preliminary search results that are limited by search category and search region.

9. The method of claim 7, wherein the search criteria comprises at least one of the search string, a search category, and the search region, and wherein the search string comprises a plurality of words, and wherein the step of assembling comprises:
  accessing a reverse index database to search for the occurrence of the plurality of words in a target documents while also factoring in at least the search region to create the preliminary search results.

10. The method of claim 7, wherein the step of correlating comprises:
  computing a correlation value for each of the plurality of entries in the preliminary search results;
  comparing the correlation value for each of the plurality of entries with a user provided confidence level factor; and
  identifying the each of the plurality of entries for inclusion into the correlated search result only if the corresponding correlation value compares favorably with the confidence level factor.

11. The method of claim 10 wherein the steps of computing and comparing is conducted during the assembling of the preliminary search results.

12. A search engine server supporting a user search input, the user search input indicating a geographical restriction, the search engine server comprising:
  at least one server configured to implement a search crawler to retrieve webpage information associated with a plurality of Internet webpages;
  at least one server configured to implement a Whois crawler to retrieve domain registration database information associated with the plurality of Internet webpages retrieved by the web crawler;
  at least one server configured to implement a correlation module to determine correlation data associating portions of the domain registration database information with portions of the webpage information; and
  at least one server configured to implement a decision module to:
    determine whether webpage contact addresses associated with webpages retrieved by the web crawler satisfy the geographical restriction by comparing the domain registration database information retrieved by the Whois crawler with webpage information retrieved by the web crawler;
    wherein determining whether the webpage contact addresses satisfy the geographical restriction includes:
      retrieving a confidence level factor;
      comparing the correlation data to the confidence level factor;
      determining whether individual webpages compare favorably between the correlation data and the confidence level factor; and
    restrict webpage information presented in response to user search input to webpage information in which the correlation module indicates a correspondence between the domain registration database information, the webpage information, and the user search input indicating the geographical restriction.

13. The search engine server of claim 12 wherein the geographical restriction is set by a user by identifying a shape around his current location in which to conduct the search.

14. The search engine server of claim 12 wherein the geographical restriction is set by a user by identifying geographic restrictors that limit the scope of the search to a geographic area.

15. The search engine server of claim 12 wherein the geographical restriction is set by a user by graphically defining a search region on a graphical user interface presented to the user.

16. The search engine server of claim 12 wherein the geographical restriction is set by a user by defining one or more areas wherein if a business lies within one of these one or more areas, then the business should not be included in the final search result list.

17. The search engine server of claim 12, further comprising:
  the webpage information includes a contact address for at least one of the plurality of Internet webpage;
  the domain registration database information includes a registration location associated with each of the plurality of Internet webpages; and
  the decision module restricts webpage information for each webpage that does not include a contact address that correlates to the registration location.

18. The search engine server of claim 12, wherein the user search input comprises at least one of the search string, a search category, and a search region, and wherein the search string comprises a plurality of words, the Internet search infrastructure further comprising:

at least one server configured to implement a reverse index database to search for the occurrence of the at least one search string in a target document while also factoring in at least the search region to create the preliminary search results.

19. The search engine server of claim 12, further comprising:

at least one server configured to implement a location tinder module to generate geographical mapping information that maps a geographical location associated of a webpage not restricted by the decision module with respect to a current location of the user on a map structure.

* * * * *